United States Patent
Kim et al.

(10) Patent No.: US 8,199,728 B2
(45) Date of Patent: Jun. 12, 2012

(54) METHOD AND APPARATUS FOR NON-SCHEDULED TRANSMISSION FOR PACKET SERVICE IN A MOBILE COMMUNICATION SYSTEM

(75) Inventors: Soeng-Hun Kim, Suwon-si (KR); Himke Van Der Velde, Middlesex (GB); Gert-Jan Van Lieshout, Middlesex (GB)

(73) Assignee: Samsung Electronics Co., Ltd (KR)

( * ) Notice: Subject to any disclaimer, the term of this patent is extended or adjusted under 35 U.S.C. 154(b) by 959 days.

(21) Appl. No.: 12/280,925

(22) PCT Filed: Feb. 15, 2007

(86) PCT No.: PCT/KR2007/000817
§ 371 (c)(1),
(2), (4) Date: Aug. 27, 2008

(87) PCT Pub. No.: WO2007/097544
PCT Pub. Date: Aug. 30, 2007

(65) Prior Publication Data
US 2009/0040969 A1    Feb. 12, 2009

(30) Foreign Application Priority Data
Feb. 27, 2006  (KR) ........................ 10-2006-0019003

(51) Int. Cl.
*H04B 7/216*    (2006.01)

(52) U.S. Cl. .................................................... 370/335
(58) Field of Classification Search .................. None
See application file for complete search history.

(56) References Cited

U.S. PATENT DOCUMENTS

| | | | |
|---|---|---|---|
| 7,013,143 B2 * | 3/2006 | Love et al. ..................... | 455/450 |
| 2002/0191592 A1 * | 12/2002 | Rogers et al. ................. | 370/352 |
| 2005/0105553 A1 * | 5/2005 | Zhang et al. .................. | 370/468 |
| 2005/0176430 A1 | 8/2005 | Lee et al. | |
| 2005/0249133 A1 | 11/2005 | Terry et al. | |
| 2005/0249154 A1 * | 11/2005 | Kim et al. ...................... | 370/328 |
| 2005/0250497 A1 * | 11/2005 | Ghosh et al. .................. | 455/436 |
| 2005/0265301 A1 | 12/2005 | Heo et al. | |
| 2006/0072503 A1 * | 4/2006 | Kim et al. ...................... | 370/329 |
| 2006/0120404 A1 * | 6/2006 | Sebire et al. .................. | 370/469 |
| 2006/0146761 A1 * | 7/2006 | Kim et al. ...................... | 370/335 |
| 2006/0209869 A1 * | 9/2006 | Kim et al. ...................... | 370/431 |
| 2006/0215604 A1 * | 9/2006 | Mueckenheim et al. ..... | 370/329 |
| 2007/0070926 A1 * | 3/2007 | Bachl et al. ................... | 370/310 |
| 2008/0247358 A1 * | 10/2008 | Damnjanovic et al. ....... | 370/329 |

FOREIGN PATENT DOCUMENTS

KR    1020060091559 A    8/2006

* cited by examiner

*Primary Examiner* — Hassan Phillips
*Assistant Examiner* — Prenell Jones
(74) *Attorney, Agent, or Firm* — The Farrell Law Firm, P.C.

(57) ABSTRACT

A method and apparatus for non-scheduled transmission for a packet service in a mobile communication system are provided. A plurality of allowed maximum packet sizes are defined for the non-scheduled transmission and a UE selects one of the maximum packet sizes under circumstances and sends packets according to the selected maximum packet size in a non-scheduled transmission mode.

32 Claims, 10 Drawing Sheets

METHOD AND APPARATUS FOR NON-SCHEDULED TRANSMISSION FOR PACKET SERVICE IN A MOBILE COMMUNICATION SYSTEM

This application claims priority under 35 U.S.C. §119(a) to an application filed in the Korean Intellectual Property Office on Feb. 27, 2006, and assigned Ser. No. 2006-0019003, and under 35 U.S.C. §365(c) to PCT application PCT/KR2007/000817 filed on Feb. 15, 2007, the contents of which are incorporated herein by reference.

BACKGROUND OF THE INVENTION

1. Field of the Invention

The present invention relates generally to a mobile communication system that sends packet data on an uplink, and more particularly, to a method and apparatus for enabling a User Equipment (UE) to efficiently implement a packet service by non-scheduled transmission.

2. Description of the Related Art

In a Wideband Code Division Multiple Access (WCDMA) communication system, a new channel called Enhanced Uplink Dedicated Channel (E-DCH or EUDCH) was introduced to improve the performance of uplink packet transmission.

The E-DCH mobile communication system has been enhanced with Node B-controlled scheduling and Hybrid Automatic Repeat reQuest (HARQ) to provide maximized uplink transmission efficiency. HARQ between a UE and a Node B increases a transmission success rate for a given transmission power. In HARQ, the Node B soft-combines an erroneous data block with its retransmission block, instead of discarding the erroneous data block, thereby increasing the reception success probability of the data block.

Figure 1:
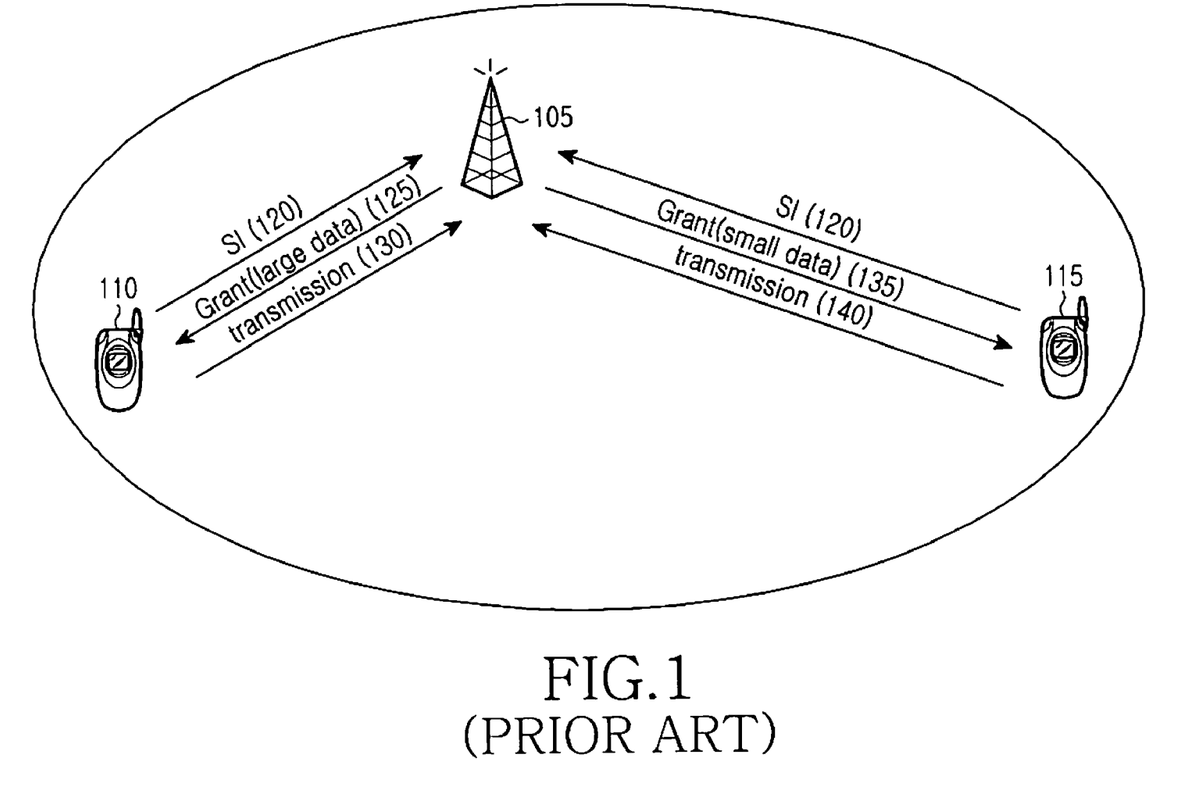
FIG. 1 illustrates an overview of Node B-controlled scheduling in an E-DCH communication system.

FIG. 1 illustrates an overview of Node B-controlled scheduling in the E-DCH communication system.

Referring to FIG. 1, a Node B 105 receives from UEs 110 and 115 reports of status changes and buffer occupancies of the UEs 110 and 115 by Scheduling Information (SI) 120. The Node B 105 controls uplink transmissions from the UEs 110 and 115 based on the SI 120. For the purpose of efficient use of limited uplink resources, the Node B 105 sends a grant 125 permitting transmission of a large amount of data to the UE 110 in a good channel status, whereas it sends a grant 135 permitting transmission of a small amount of data to the UE 115 in a poor channel status. The UEs 110 and 115 send uplink packets 130 and 140 within their allowed data amounts.

Due to the fact that the UE reports its buffer occupancy and then receives a grant representing a scheduling result from the Node B, the above Node B-controlled scheduling scheme is not viable for a delay-sensitive service with small-size packets that are continuously generated. For instance, Voice over Internet Protocol (VoIP) is sensitive to delay and preferably, VoIP packets are sent immediately when they are created. With the buffer occupancy report and the scheduling, the VoIP packet transmission will suffer a long time delay.

One of the features of a service such as VoIP is a relatively constant packet size. To efficiently support the delay-sensitive service with continuously generated packets of a relatively constant small size, the concept of non-scheduled transmission has been introduced. The non-scheduled transmission scheme allows the terminal to autonomously send packets of up to a predetermined size without grants from the Node B in a service flow allowing non-scheduled transmission.

The Node B determines whether to allow the UE non-scheduled transmission, taking into account the characteristics or Quality of Service (QoS) requirement of a UE-requested service. Non-scheduled transmission is allowed for the UE on a service flow-by-service flow basis. In a Universal Mobile Telecommunication System (UMTS) communication system, service flows with the same QoS are collectively called a Medium Access Control (MAC)-d flow and non-scheduled transmission is set on a MAC-d flow basis.

A parameter defining non-scheduled transmission is a maximum MAC-e Protocol Data Unit (PDU) content size, i.e. a maximum packet size allowed for non-scheduled transmission. The terminal can send packets of up to the maximum MAC-e PDU content size, generated in a MAC-d flow allowing non-scheduled transmission, without grants from the Node B.

Figure 2:
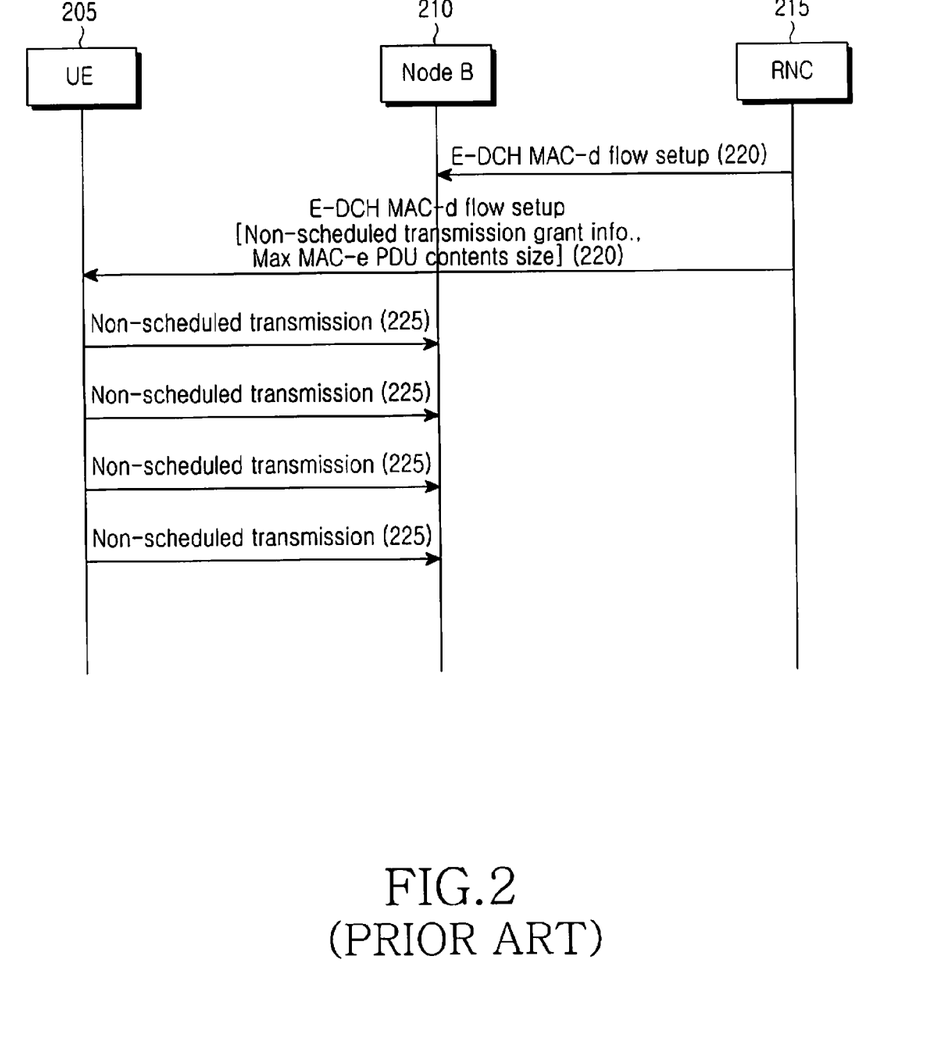
FIG. 2 is a diagram illustrating a signal flow for a typical non-scheduled transmission.

FIG. 2 is a diagram illustrating a signal flow for a typical non-scheduled transmission.

Referring to FIG. 2, a Radio Network Controller (RNC) 215, which is responsible for managing radio resources between a Node B 210 and a UE 205, signals the Identifier (ID) of the MAC-d flow and the maximum MAC-e PDU content size to the Node B 210 and the UE 205 in step 220. The UE 205 can autonomously send packets at or below the maximum MAC-e PDU content size, which are generated in the MAC-d flow, without grants from the Node B 210 in step 225. Considering the fact that the packets at or below the maximum MAC-e PDU content size can be received in the MAC-d flow at any time, the Node B 210 schedules other UEs and other service flows.

However, the above non-scheduled transmission scheme may cause a degradation in the quality of VoIP, which is against the original intention of the non-scheduled transmission scheme. In an early stage of VoIP communications, a few relatively large packets are generated. Unless a maximum MAC-e PDU content size set for the VoIP service is large enough to enable transmission of one large packet at one time, this packet is sent separately a plurality of times. On the contrary, if the maximum MAC-e PDU content size is large enough for the initial packets, resource dissipation results after small packets are generated. That is why the conventional non-scheduled transmission scheme inevitably suffers from voice quality degradation and delay in an early communication stage.

SUMMARY OF THE INVENTION

The present invention has been made to address at least the above problems and/or disadvantages and to provide at least the advantages described below. Accordingly, an aspect of the present invention provides a method and apparatus for supporting a packet-based voice service by non-scheduled transmission.

Another aspect of the present invention provides a method and apparatus for using a plurality of allowed maximum packet sizes for a service flow that allows non-scheduled transmission.

A further aspect of the present invention provides a method and apparatus for switching between a plurality of maximum packet sizes set for a service flow that allows non-scheduled transmission.

According to one aspect of the present invention, a non-scheduled transmission method is provided for providing a packet service in a mobile communication system. When a service allowing non-scheduled transmission starts, packets generated for the service are sent according to a first packet size in a non-scheduled transmission mode. When a predetermined switching condition is satisfied during the packet transmission according to the first packet size, packets generated for the service are sent according to a second packet size that is different from the first packet size in the non-scheduled transmission mode.

According to another aspect of the present invention, an apparatus of a UE is provided for performing non-scheduled transmission to provide a packet service in a mobile communication system. When a service allowing non-scheduled transmission starts, a controller selects a first packet size for the service. When a predetermined switching condition is satisfied during the packet transmission according to the first packet size, the controller selects a second packet size that is different from the first packet size. A transmitter sends packets generated for the service according to the selected packet size in a non-scheduled transmission mode.

According to a further aspect of the present invention, a method is provided for receiving data sent in a non-scheduled transmission mode for a packet service in a mobile communication system. When a service allowing non-scheduled transmission starts, packets generated for the service are received according to a first packet size in the non-scheduled transmission mode. When a predetermined switching condition is satisfied during the packet reception according to the first packet size, packets generated for the service are received according to a second packet size that is different from the first packet size in the non-scheduled transmission mode.

According to an additional aspect of the present invention, an apparatus of a Node B is provided for receiving data sent in a non-scheduled transmission mode for a packet service in a mobile communication system. When a service allowing non-scheduled transmission starts, a scheduler selects a first packet size for the service. When a predetermined switching condition is satisfied during operating in the non-scheduled transmission mode according to the first packet size, the scheduler selects a second packet size that is different from the first packet size. A receiver receives packets generated for the service according to the selected packet size in the non-scheduled transmission mode.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF PREFERRED EMBODIMENTS

Preferred embodiments of the present invention are described in detail with reference to the accompanying drawings. Similar components are designated by similar reference numerals although they are illustrated in different drawings. Detailed descriptions of constructions or processes known in the art may be omitted to avoid obscuring the subject matter of the present invention.

The present invention defines two or more different allowed maximum packet sizes for a service flow, allowing non-scheduled transmission by a non-scheduled grant so that an appropriate allowed maximum packet size is used according to circumstances. Non-scheduled transmission is a transmission mode in which the UE can send data autonomously even though a Node B has not allocated resources to a UE by a scheduled grant. Based on a non-scheduled grant set during a service setup, the UE can send packets without a scheduled grant from the Node B.

The non-scheduled grant indicates a maximum packet size allowed for non-scheduled transmission. The UE and the Node B define available maximum packet sizes for non-scheduled transmission and change to an appropriate maximum packet size for the non-scheduled transmission, if a preset condition is fulfilled. This non-scheduled transmission is useful to a service in which the size of packets varies regularly, such as VoIP. The embodiments of the present invention will be described in the context of VoIP, to which the present invention is not limited.

Typically, header compression is used for the VoIP service. Since initial packets with full headers are exchanged between the UE and the Node B, a few large packets precede small packets in the VoIP service. Characteristics of VoIP traffic are described below with reference to FIG. 3.

Figure 3:
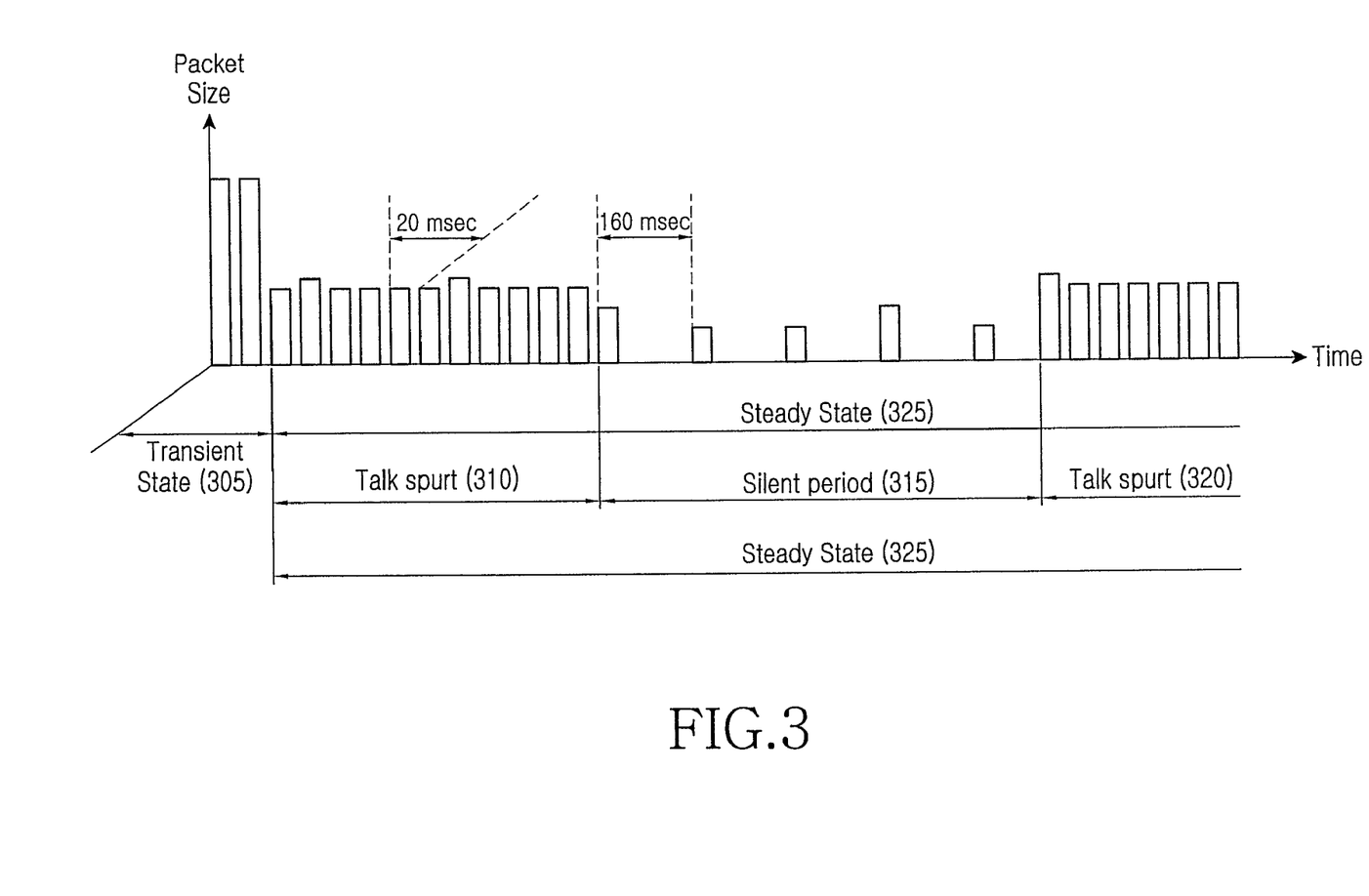
FIG. 3 illustrates characteristics of VoIP traffic, according to an embodiment of the present invention.

Referring to FIG. 3, first packets generated after setup of the VoIP service are attached with non-compressed headers, i.e. full headers. These packets are approximately 95 bytes in length. A state where the packets with the full headers (hereinafter, referred to as full packets) are created is called a transient state 305.

After the exchange of the full packets, the headers are compressed to a few bytes, and thus the packet size is decreased to 35 bytes. Following packets are kept to be about 35 bytes, and a state where packets of the relatively constant size are generated is called a steady state 325. The steady state 325 is broken up into talk spurts 310 and 320, and a silent period 315. VoIP packets are generated frequently every 20 ms in the talk spurts 310 and 320, and less frequently every 160 ms in the silent period 315. These packets are of a relatively constant size, compared to packets in the transient state 305.

In accordance with an embodiment of the present invention, to provide a service with the above-described traffic characteristic, such as VoIP, a first packet size and a second packet size are defined for transient-state packets and steady-state packets, respectively, so that one of the first and second packets is selected according to the states. In a modified embodiment allowed maximum packet sizes are further defined for the talk spurts and the silent period. Herein, two packet sizes are set for non-scheduled transmission, by way of example.

Figure 4:
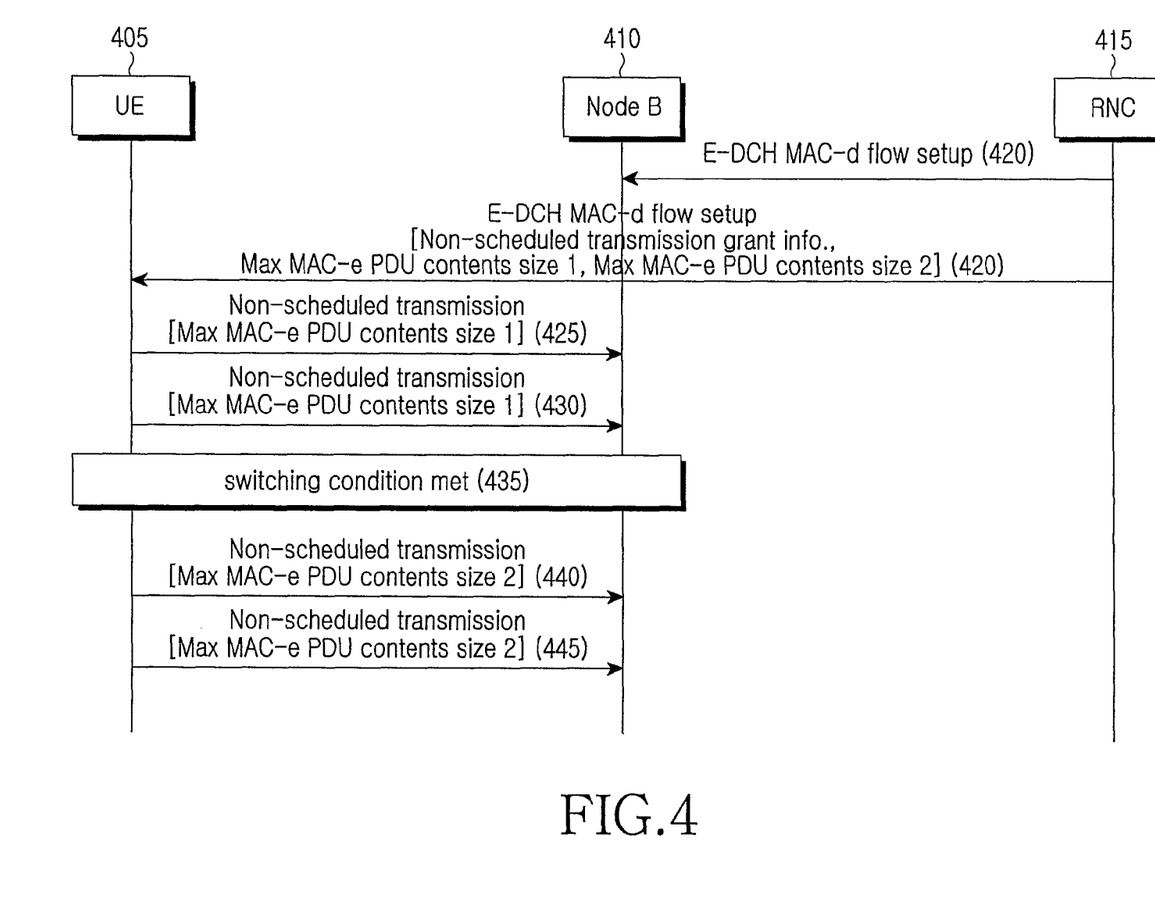
FIG. 4 is a diagram illustrating a signal flow for non-scheduled transmission according to an embodiment of the present invention.

FIG. 4 is a diagram illustrating a signal flow for non-scheduled transmission according to an embodiment of the present invention.

Referring to FIG. 4, a network node that controls services for UEs, an RNC 415 establishes an E-DCH MAC-d flow for a UE 405, taking into account of the QoS requirement of a service to be provided to the UE 405. The RNC 415 sends a control message 420 including configuration information of the E-DCH MAC-d flow to the UE 405 and a Node B 410.

The E-DCH MAC-d flow configuration information includes, for example, the HARQ profile of the MAC-d flow and at least one non-scheduled grant for the MAC-d flow. The HARQ profile provides information for controlling HARQ operations to fulfill the QoS requirement of the MAC-d flow. For example, the HARQ profile includes a transmit power offset or a maximum retransmission number for the MAC-d flow. The non-scheduled grant indicates a maximum MAC-e PDU content size, i.e. a maximum packet size allowed for non-scheduled transmission. The MAC-d flow allowing non-scheduled transmission may deliver packets at or below the maximum MAC-e PDU content size to the Node B without a scheduled grant.

Embodiments of the present invention signal a plurality of maximum MAC-e PDU content sizes and a switching condition according to the characteristics of services mapped to the MAC-d flow, as the E-DCH MAC-d flow configuration information. If VoIP is mapped to the MAC-d flow, a first non-scheduled grant for the transient state (Max MAC-e PDU content size 1), i.e. a maximum packet size for the transient state, and a second non-scheduled grant for the steady state (Max MAC-e PDU content size 2), i.e. maximum packet size for the steady state, are signaled.

The switching condition is about switching between Max MAC-e PDU content size 1 and Max MAC-e PDU content size 2. It can be signaled explicitly or set implicitly.

Max MAC-e PDU content size 1 is set large enough to send relatively large VoIP packets generated in the transient state and Max MAC-e PDU content size 2 is set large enough to send relatively small VoIP packets generated in the steady state. It follows that Max MAC-e PDU content size 1 is larger than Max MAC-e PDU content size 2.

The usages of Max MAC-e PDU content size 1 and Max MAC-e PDU contents size 2 are given as follows.

Max MAC-e PDU content size 1 applies to the transient state. It is set according to the size of full VoIP packets.

Max MAC-e PDU content size 2 applies to the steady state. It is set according to the size of VoIP packets with compressed headers.

Max MAC-e PDU content size 1 is first used in an early state of the service. If a predetermined switching condition is satisfied, both the UE and the Node B switch from Max MAC-e PDU content size 1 to Max MAC-e PDU content size 2.

Upon notification of Max MAC-e PDU content size 1 and Max MAC-e PDU content size 2, the UE and the Node B exchange VoIP packets using Max MAC-e PDU content size 1 when the service starts. Specifically, the UE sends packets at or below Max MAC-e PDU content size 1 to the Node B without receiving a scheduled grant from the Node B. The Node B schedules the UE and other UEs, considering the fact that packets at or below Max MAC-e PDU content size 1 can be received without scheduling. In other words, the Node B keeps uplink resources with which to receive the packets at or below Max MAC-e PDU content size 1 from the UE. Until the switching condition is satisfied, the UE sends packets using Max MAC-e PDU content size 1 as a non-scheduled grant in steps 425 and 430. When the switching condition is met in step 435, the UE sends packets using Max MAC-e PDU content size 2 as a non-scheduled grant in steps 440 and 445.

The switching condition can be one of the following.

Figure 5:
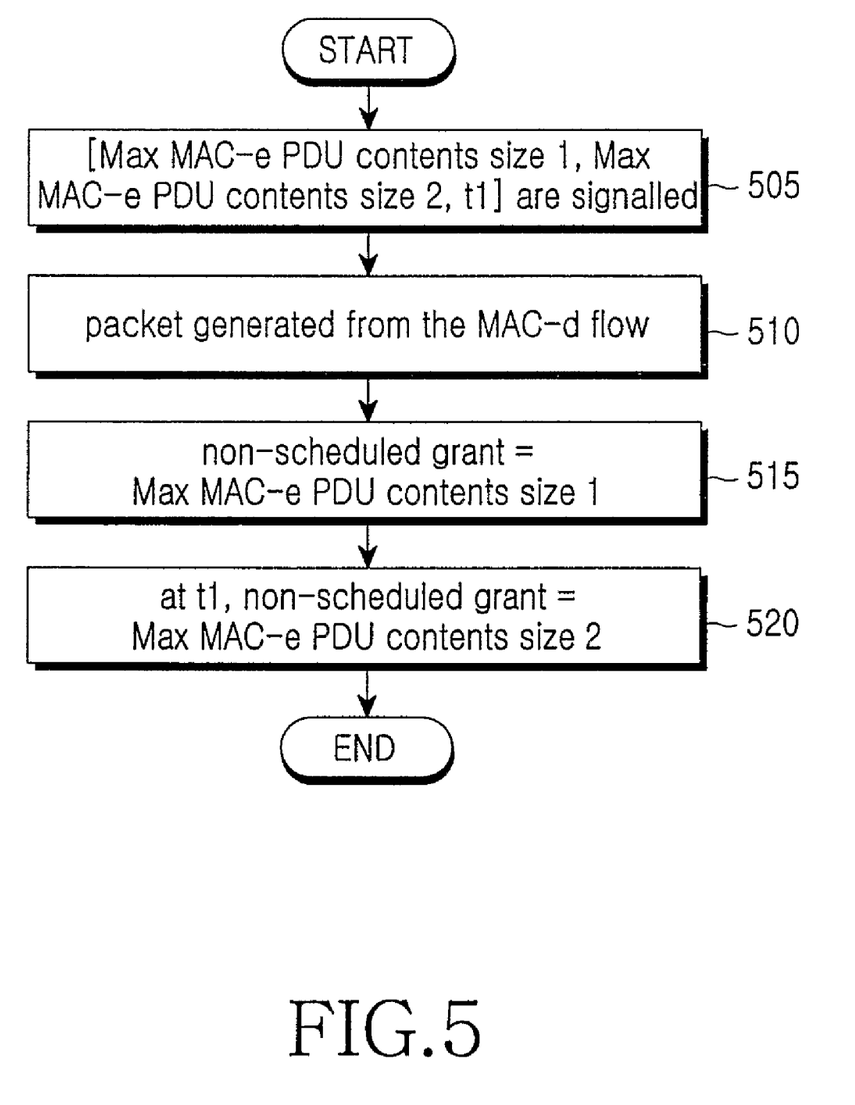
FIG. 5 is a flowchart illustrating an operation of a UE according to an embodiment of the present invention.

The UE and the Node B change the non-scheduled grant to Max MAC-e PDU content size 2 a predetermined time after the service start (embodiment of FIG. 5).

Figure 6:
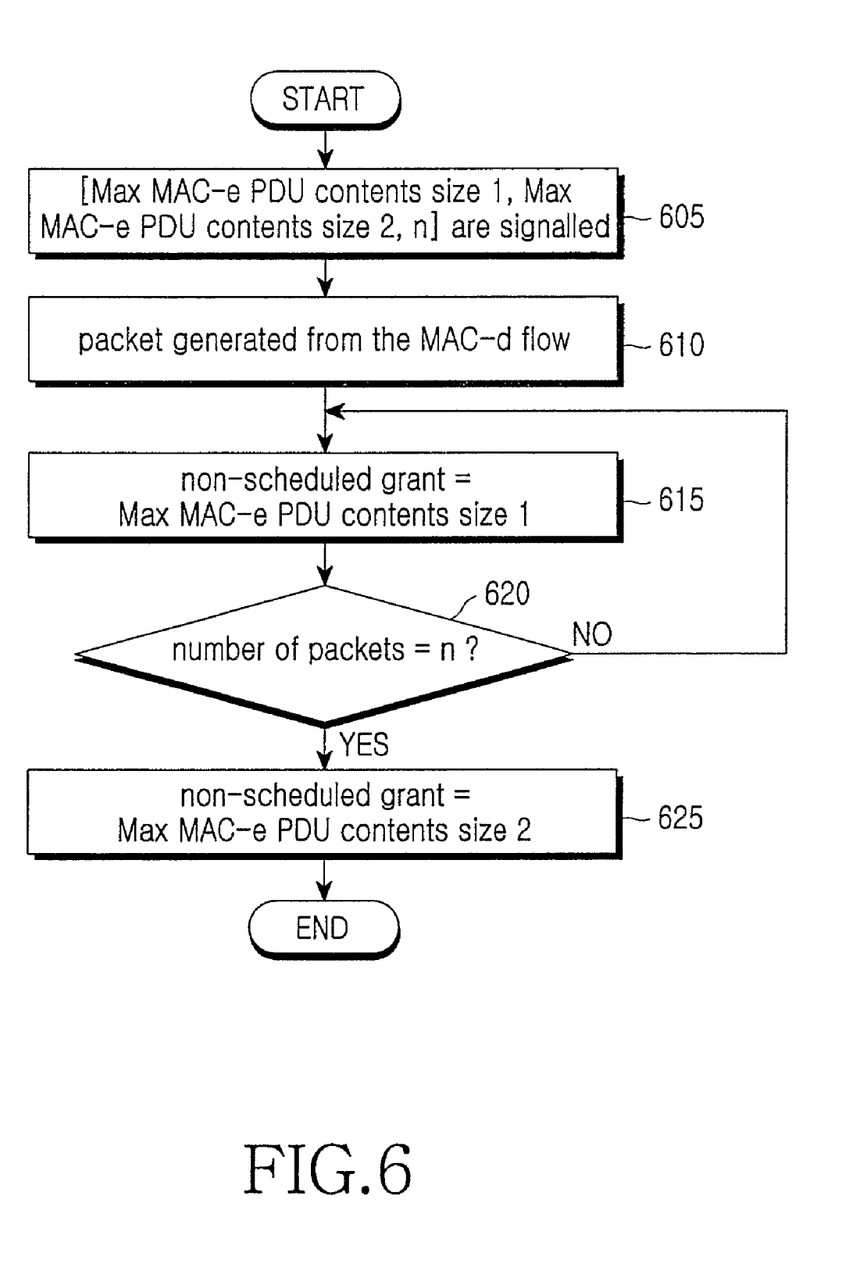
FIG. 6 is a flowchart illustrating an operation of the UE according to another embodiment of the present invention.

After a predetermined number of packets are sent using Max MAC-e PDU content size 1, the non-scheduled grant is changed to Max MAC-e PDU content size 2 (embodiment of FIG. 6).

Figure 7:
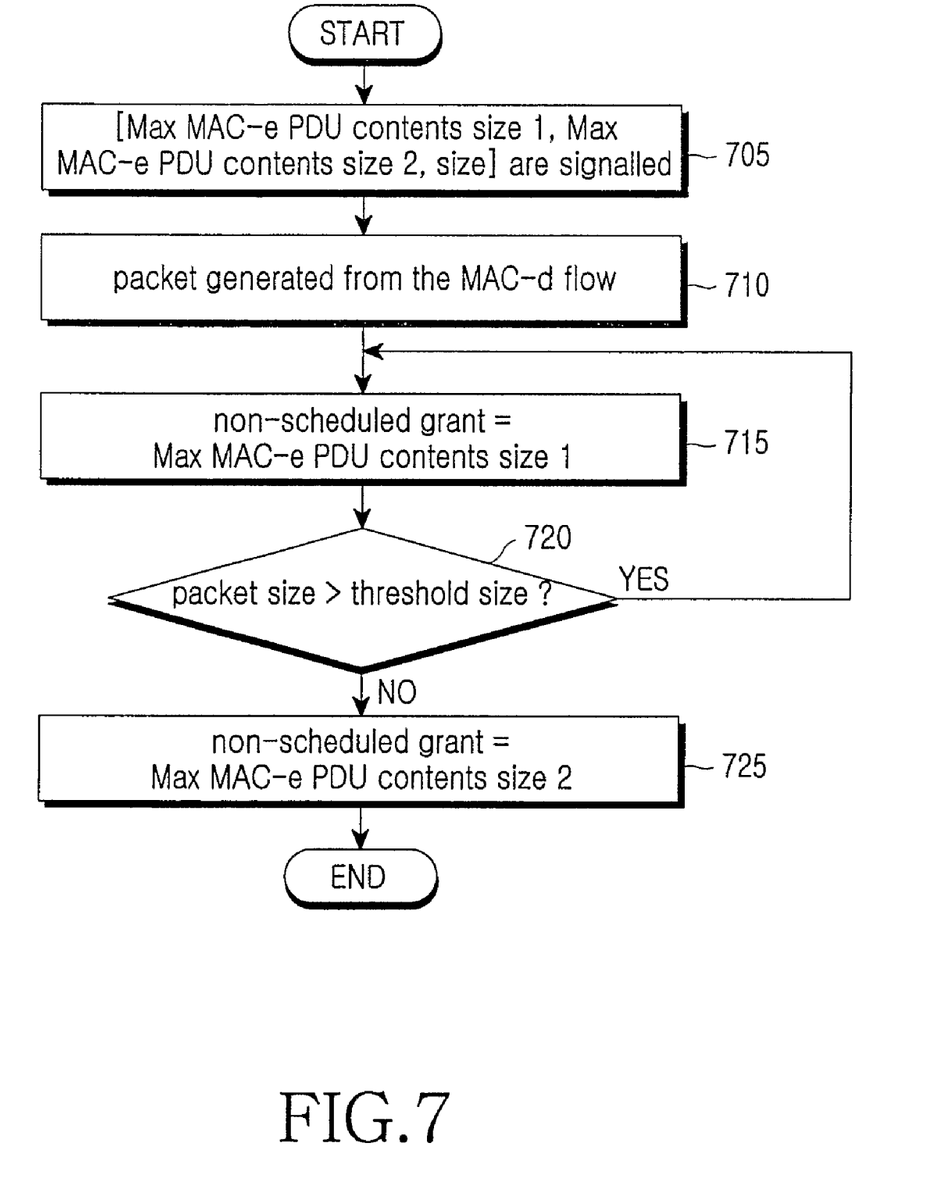
FIG. 7 is a flowchart illustrating an operation of the UE according to a further embodiment of the present invention.

If the size of non-scheduled transmitted packets satisfies a predetermined condition, the non-scheduled grant is changed to Max MAC-e PDU content size 2 (embodiment of FIG. 7).

FIG. 5 is a flowchart illustrating an operation of the UE according to an embodiment of the present invention. The UE switches from Max MAC-e PDU content size 1 to Max MAC-e PDU content size 2 a predetermined time after a service starts.

Referring to FIG. 5, Max MAC-e PDU contents size 1, Max MAC-e PDU content size 2, and a switching time t1 as a switching condition regarding a MAC-d flow, are signaled to the UE from the RNC in step 505. t1 indicates a time when the non-scheduled grant changes from Max MAC-e PDU content size 1 to Max MAC-e PDU content size 2.

Upon generation of an initial packet in the MAC-d flow in step 510, the UE uses Max MAC-e PDU content size 1 as the non-scheduled grant of the MAC-d flow in step 515. Thus, the UE sends packets autonomously to the Node B without receiving a scheduled grant until the switching condition is satisfied, as long as the packets are of or below Max MAC-e PDU content size 1. Specifically, packets at or below Max MAC-e PDU content size 1 in the MAC-d flow are sent without receiving a scheduled grant from the Node B, whereas packets larger than Max MAC-e PDU content size 1 in the MAC-d flow are segmented to the size, Max MAC-e PDU content size 1, and then sent.

At time t1, the UE changes the non-scheduled grant to Max MAC-e PDU content size 2 in step 520. Unless the non-scheduled grant is changed by higher-layer signaling, the UE autonomously sends MAC-d flow packets using Max MAC-e PDU content size 2. Specifically, packets at or below Max MAC-e PDU content size 2 in the MAC-d flow are sent without receiving a scheduled grant from the Node B, whereas packets larger than Max MAC-e PDU content size 2 in the MAC-d flow are segmented to the size, Max MAC-e PDU content size 2, and then sent.

FIG. 6 is a flowchart illustrating an operation of the UE according to another embodiment of the present invention. If the UE has sent a predetermined number of packets using Max MAC-e PDU content size 1 after the service starts, it switches from Max MAC-e PDU content size 1 to Max MAC-c PDU content size 2.

Referring to FIG. 6, Max MAC-e PDU content size 1, Max MAC-e PDU content size 2, and a threshold packet number n as a switching condition regarding a MAC-d flow are signaled to the UE from the RNC in step 605. n indicates the number of packets that can be sent using Max MAC-e PDU content size 1 as the non-scheduled grant. The packets may be MAC-e PDUs or MAC-d PDUs, and the PDU type of the packets is preset.

Upon generation of an initial packet in the MAC-d flow in step 610, the UE uses Max MAC-e PDU content size 1 as the non-scheduled grant of the MAC-d flow in step 615. Thus, the UE sends packets autonomously to the Node B without receiving a scheduled grant until the switching condition is satisfied, as long as the packets are of or below Max MAC-e PDU content size 1. The terminal counts the number of the packets sent using Max MAC-e PDU content size 1.

In step 620, the UE compares the count with n. If the count reaches n, the UE goes to step 625. If the count is less than n, the UE returns to step 615.

In step 625, the UE changes the non-scheduled grant to Max MAC-e PDU content size 2. Unless the non-scheduled grant is changed by higher-layer signaling, the UE autonomously sends MAC-d flow packets using Max MAC-e PDU content size 2.

FIG. 7 is a flowchart illustrating an operation of the UE according to a further embodiment of the present invention. When a packet smaller than a predetermined size is generated after the service starts, the UE switches from Max MAC-e PDU content size 1 to Max MAC-e PDU content size 2.

Referring to FIG. 7, Max MAC-e PDU contents size 1, Max MAC-e PDU content size 2, and a threshold packet size as a switching condition regarding a MAC-d flow are signaled to the UE from the RNC in step 705. The threshold size is signaled explicitly or implicitly. For example, Max MAC-e PDU content size 2 or a similar value can be used as the threshold size. In this case, the threshold size need not be signaled separately. That is, if a packet smaller than Max MAC-e PDU content size 2 is generated, the non-scheduled grant is changed. Packets may be MAC-e PDUs or MAC-d PDUs, and the PDU type of the packets is preset.

Upon generation of an initial packet in the MAC-d flow in step 710, the UE uses Max MAC-e PDU content size 1 as the non-scheduled grant of the MAC-d flow in step 715. Thus, the UE sends packets autonomously to the Node B without receiving a scheduled grant until the switching condition is satisfied, as far as the packets are at or below Max MAC-e PDU content size 1.

In step 720, the UE compares the size of each packet generated in the MAC-d flow with the threshold size. As stated above, the packet is a MAC-e PDU or a MAC-d PDU. If the packet size is larger than the threshold size, the UE returns to step 715 to send the packet using Max MAC-e PDU content size 1. If the packet size is less than or equal to the threshold size, the UE changes the non-scheduled grant to Max MAC-e PDU content size 2 in step 725. Unless the non-scheduled grant is changed by higher-layer signaling, the UE autonomously sends MAC-d flow packets using Max MAC-e PDU content size 2.

Figure 8:
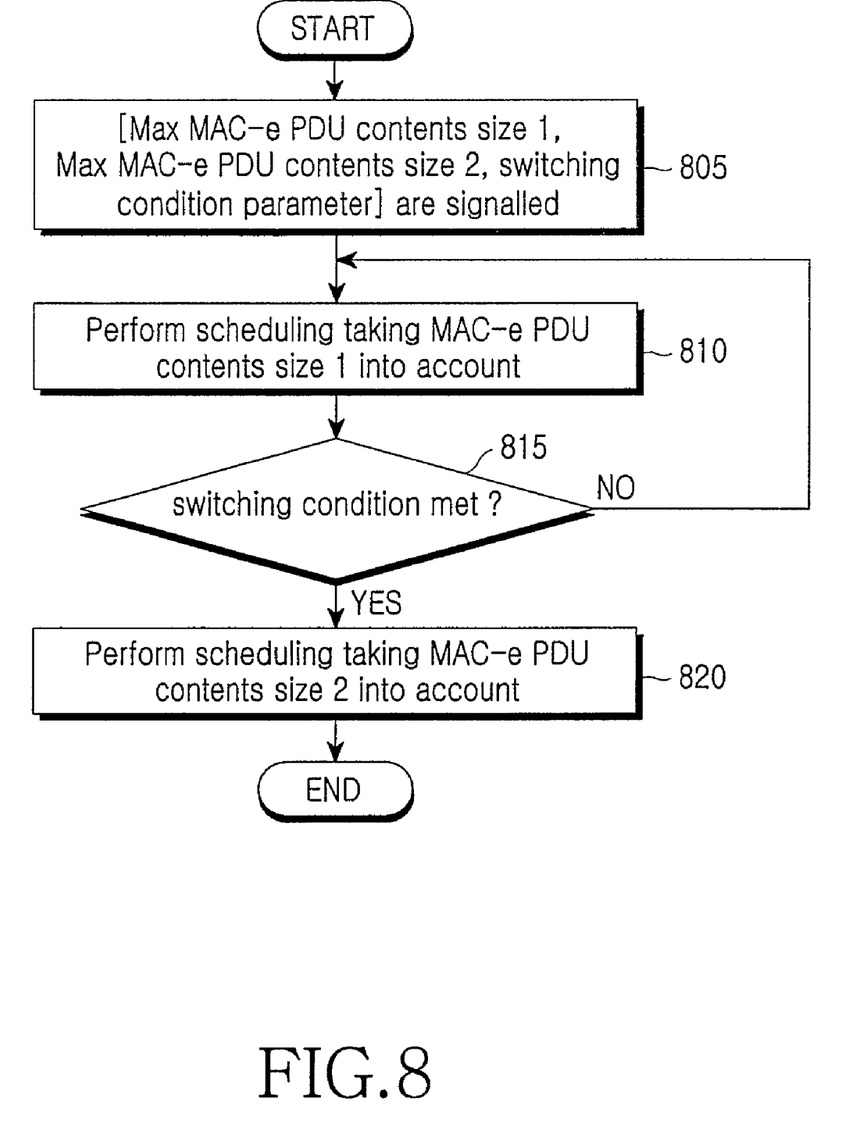
FIG. 8 is a flowchart illustrating an operation of a Node B according to an embodiment of the present invention.

FIG. 8 is a flowchart illustrating an operation of the Node B according to an embodiment of the present invention. The Node B operation applies commonly to the embodiments of FIGS. 5-7 of the UE operation.

Referring to FIG. 8, the Node B receives Max MAC-e PDU contents size 1, Max MAC-e PDU content size 2, and a switching condition parameter from the RNC in step 805. The switching condition parameter is a parameter defining switching of a non-scheduled grant. In the embodiments of FIGS. 5-7, the switching condition parameters are t1, n, and a threshold size, respectively.

In an early stage of the service, the Node B considers the non-scheduled grant of the MAC-d flow to be Max MAC-e PDU content size 1. In other words, the Node B schedules the UE and other UEs, considering the fact that the UE may autonomously send packets at or below Max MAC-e PDU content size 1 without a scheduled grant from the Node B.

In step 815, the Node B determines whether the switching condition defined by the switching condition parameter has been satisfied. If the switching condition has been satisfied, the Node B goes to step 815. Otherwise, the Node B returns to step 810. The switching condition is that t1 is reached, n packets are sent using Max MAC-e PDU content size 1, and the size of a packet is equal to or less than the threshold size.

In step 820, the Node B switches the non-scheduled grant of the MAC-d flow to Max MAC-e PDU content size 2. Unless the non-scheduled grant is changed by higher-layer signaling, the Node B schedules the UE and other UEs, taking into account Max MAC-e PDU content size 2.

Figure 9:
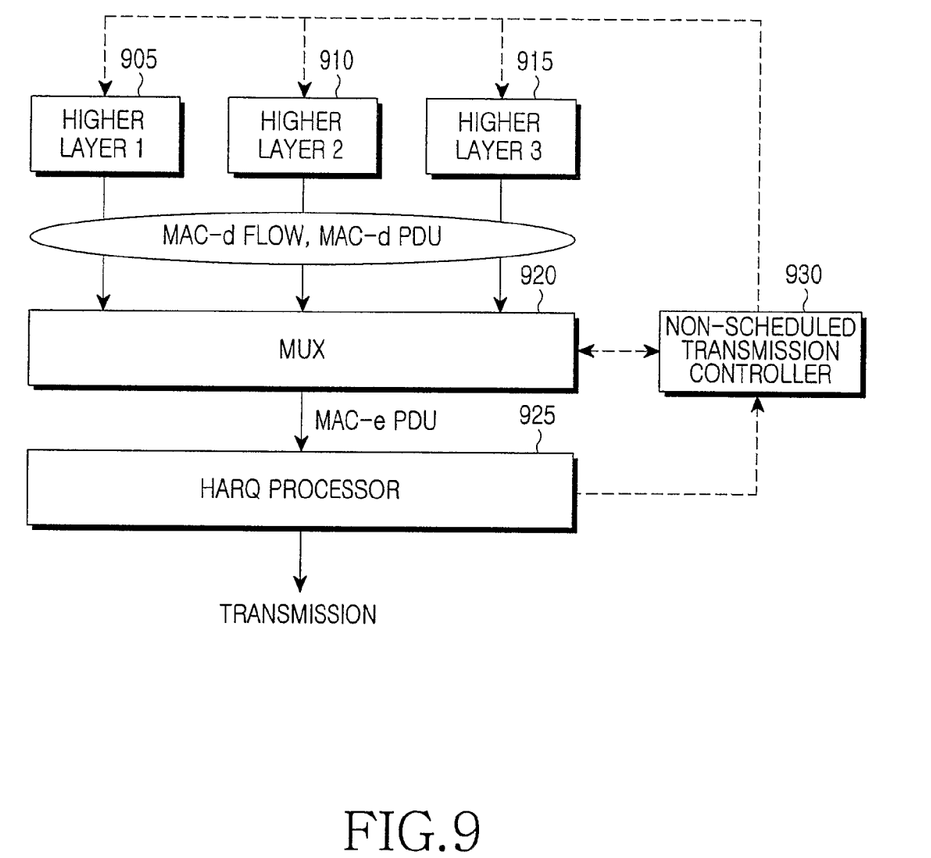
FIG. 9 is a block diagram of the UE according to an embodiment of the present invention.

FIG. 9 is a block diagram of the UE according to an embodiment of the present invention. Referring to FIG. 9, the UE includes a plurality of higher-layer entities 905, 910 and 915, a Multiplexer (MUX), and a HARQ processor 925, and a non-scheduled transmission controller 930.

The higher-layer entities 905, 910 and 915 are configured, each on a per-service basis. They reconfigure higher-layer data to a predetermined size and provide control to Automatic Repeat reQuest (ARQ), for example.

Data created from the higher-layer entities 905, 910 and 915 are called MAC-d PDUs. Higher-layer entities requiring the same QoS collectively form one MAC-d flow. Therefore, one MAC-d flow may be associated with one or more higher layers. The data is reconfigured to MAC-e PDUs in the MUX 920 and sent on a radio channel in the HARQ processor 925.

The non-scheduled transmission controller 930 controls data transmissions from the higher-layer entities 905, 910 and 915 associated with the MAC-d flow allowing non-scheduled transmission.

To be more specific, the non-scheduled transmission controller 930 receives from the RNC, Max MAC-e PDU content size 1, Max MAC-e PDU content size 2, and a switching condition parameter (t1, n, or threshold size), determines a non-scheduled grant to be used at a current time, and notifies the higher-layer entities 905, 910 and 915 of data amounts that can be sent by non-scheduled transmission. The higher-layer entities 905, 910 and 915 output the notified amounts of data to the MUX 920. At the same time, the non-scheduled transmission controller 930 determines the non-scheduled grant in accordance with one of the afore-described embodiments or in combination with another.

Figure 10:
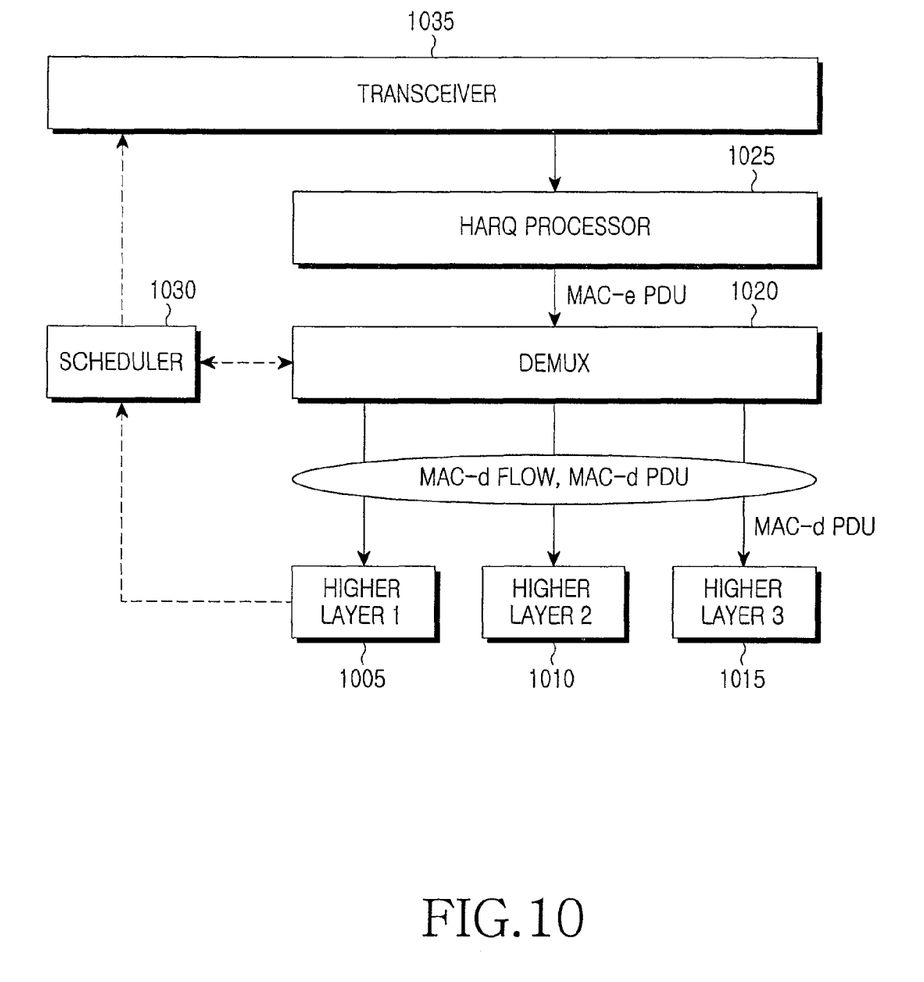
FIG. 10 is a block diagram of the Node B according to an embodiment of the present invention.

FIG. 10 is a block diagram of the Node B according to an embodiment of the present invention. Referring to FIG. 10, the Node B includes a plurality of higher-layer entities 1005, 1010, and 1015, a Demultipelxer (DEMUX) 1020, an HARQ processor 1025, a scheduler 1030, and a transceiver 1035.

The HARQ processor 1025 performs an HARQ operation on data received through the transceiver 1035 and provides successfully received MAC-e PDUs to the DEMUX 1020. The DEMUX 1020 reconfigures the received data to higher-layer data and provides them to the higher-layer entities 1005, 1010, and 1015. These data are called MAC-d PDUs.

The higher-layer entities 1005, 1010, and 1015 are configured, each on a per-service basis. They interpret the data received from the DEMUX 1020 and provide control to ARQ, for example. The higher-layer entities 1005, 1010, and 1015 are counterparts of the higher-layer entities 905, 910 and 915.

The scheduler 1030 controls data transmission from the higher-layer entities 1005, 1010, and 1015 associated with a MAC-d flow allowing non-scheduled transmission. It receives from the RNC, Max MAC-e PDU content size 1, Max MAC-e PDU content size 2, and a switching condition parameter (t1, n, or threshold size), determines a non-scheduled grant to be used at a current time, and schedules according to the non-scheduled grant. The scheduling results are sent to UEs in scheduled grants through the transceiver 1035. The scheduler 1030 determines the non-scheduled grant in accordance with one of the afore-described embodiments or in combination with another.

As is apparent from the description, the present invention minimizes packet transmission delay and enables efficient use of radio transmission resources by applying different non-scheduled grants to full packets and packets with compressed headers, when a packet service is provided by non-scheduled transmission.

While the invention has been shown and described with reference to certain preferred embodiments thereof, it will be understood by those skilled in the art that various changes in form and details may be made therein without departing from the spirit and scope of the present invention as defined by the appended claims.

What is claimed is:

1. A non-scheduled transmission method for providing a packet service in a mobile communication system, comprising the steps of:
   sending packets generated for a service allowing non-scheduled transmission according to a first packet size in a non-scheduled transmission mode, when the service starts; and
   sending packets generated for the service according to a second packet size that is different from the first packet size in the non-scheduled transmission mode, when a predetermined switching condition is satisfied during packet transmission according to the first packet size.

2. The non-scheduled transmission method of claim 1, wherein the service comprises a Voice over Internet Protocol (VoIP) service.

3. The non-scheduled transmission method of claim 2, wherein the first packet size is determined according to a maximum size of VoIP packets generated in a transient state of the VoIP service, and the second packet size is determined according to a maximum size of VoIP packets generated in a steady state of the VoIP service.

4. The non-scheduled transmission method of claim 1, wherein the first packet size is a size of an IP packet comprising a full IP header and the second packet size is a size of an IP packet comprising a compressed IP header.

5. The non-scheduled transmission method of claim 1, further comprising determining that the predetermined switching condition is satisfied when a time indicated by a switching condition parameter is reached after the service starts.

6. The non-scheduled transmission method of claim 1, further comprising determining that the predetermined switching condition is satisfied when a number of packets generated according to the first packet size is equal to a packet number indicated by a switching condition parameter.

7. The non-scheduled transmission method of claim 1, further comprising determining that the predetermined switching condition is satisfied when the size of a packet generated for the service is less than or equal to a threshold size indicated by a switching condition parameter.

8. The non-scheduled transmission method of claim 1, further comprising receiving a plurality of packet sizes for the non-scheduled transmission of the service and a switching condition parameter for switching between the packet sizes.

9. An apparatus of a User Equipment (UE) for performing non-scheduled transmission to provide a packet service in a mobile communication system, comprising:
   a controller for selecting a first packet size for a service allowing non-scheduled transmission when the service starts, and selecting a second packet size that is different from the first packet size when a predetermined switching condition is satisfied during packet transmission according to the first packet size; and
   a transmitter for sending packets generated for the service according to the selected packet size in a non-scheduled transmission mode.

10. The apparatus of claim 9, wherein the service comprises a Voice over Internet Protocol (VoIP) service.

11. The apparatus of claim 10, wherein the first packet size is determined according to a maximum size of VoIP packets generated in a transient state of the VoIP service, and the second packet size is determined according to a maximum size of VoIP packets generated in a steady state of the VoIP service.

12. The apparatus of claim 9, wherein the first packet size is a size of an IP packet comprising a full IP header and the second packet size is a size of an IP packet comprising a compressed IP header.

13. The apparatus of claim 9, wherein the controller determines that the predetermined switching condition is satisfied when a time indicated by a switching condition parameter is reached after the service starts.

14. The apparatus of claim 9, wherein the controller determines that the predetermined switching condition is satisfied when a number of packets generated according to the first packet size is equal to a packet number indicated by a switching condition parameter.

15. The apparatus of claim 9, wherein the controller determines that the predetermined switching condition is satisfied when the size of a packet generated for the service is less than or equal to a threshold size indicated by a switching condition parameter.

16. The apparatus of claim 9, wherein the controller receives a plurality of packet sizes for the non-scheduled transmission of the service and a switching condition parameter defining the switching condition.

17. A method for receiving data sent in a non-scheduled transmission mode for a packet service in a mobile communication system, comprising the steps of:
   receiving packets generated for a service allowing non-scheduled transmission according to a first packet size in the non-scheduled transmission mode, when the service starts; and
   receiving packets generated for the service according to a second packet size that is different from the first packet size in the non-scheduled transmission mode, when a predetermined switching condition is satisfied during packet reception according to the first packet size.

18. The method of claim 17, wherein the service comprises a Voice over Internet Protocol (VoIP) service.

19. The method of claim 18, wherein the first packet size is determined according to a maximum size of VoIP packets generated in a transient state of the VoIP service, and the second packet size is determined according to a maximum size of VoIP packets generated in a steady state of the VoIP service.

20. The method of claim 17, wherein the first packet size is a size of an IP packet comprising a full IP header and the second packet size is a size of an IP packet comprising a compressed IP header.

21. The method of claim 17, further comprising determining that the predetermined switching condition is satisfied, when a time indicated by a switching condition parameter is reached after the service starts.

22. The method of claim 17, further comprising determining that the predetermined switching condition is satisfied when a number of packets generated according to the first packet size is equal to a packet number indicated by a switching condition parameter.

23. The method of claim 17, further comprising determining that the predetermined switching condition is satisfied when the size of a packet generated for the service is less than or equal to a threshold size indicated by a switching condition parameter.

24. The method of claim 17, further comprising receiving a plurality of packet sizes for the non-scheduled transmission of the service and a switching condition parameter for switching between the packet sizes.

25. An apparatus of a Node B for receiving data sent in a non-scheduled transmission mode for a packet service in a mobile communication system, comprising:
- a scheduler for selecting a first packet size a service allowing non-scheduled transmission when the service starts, and selecting a second packet size that is different from the first packet size when a predetermined switching condition is satisfied during operating in the non-scheduled transmission mode according to the first packet size; and
- a receiver for receiving packets generated for the service according to the selected packet size in the non-scheduled transmission mode.

26. The apparatus of claim 25, wherein the service comprises a Voice over Internet Protocol (VoIP) service.

27. The apparatus of claim 26, wherein the first packet size is determined according to a maximum size of VoIP packets generated in a transient state of the VoIP service, and the second packet size is determined according to a maximum size of VoIP packets generated in a steady state of the VoIP service.

28. The apparatus of claim 25, wherein the first packet size is a size of an IP packet comprising a full IP header and the second packet size is a size of an IP packet comprising a compressed IP header.

29. The apparatus of claim 25, wherein the scheduler determines that the predetermined switching condition is satisfied when a time indicated by a switching condition parameter is reached after the service starts.

30. The apparatus of claim 25, wherein the scheduler determines that the predetermined switching condition is satisfied when a number of packets generated according to the first packet size is equal to a packet number indicated by a switching condition parameter.

31. The apparatus of claim 25, wherein the scheduler determines that the predetermined switching condition is satisfied when the size of a packet generated for the service is less than or equal to a threshold size indicated by a switching condition parameter.

32. The apparatus of claim 25, wherein the scheduler receives a plurality of packet sizes for the non-scheduled transmission of the service and a switching condition parameter for switching between the packet sizes.

* * * * *